United States Patent
Zhu

(10) Patent No.: US 11,388,370 B1
(45) Date of Patent: Jul. 12, 2022

(54) DUAL DISPLAY DUAL FACING CAMERA VIDEO CALL SYSTEM

(71) Applicant: Motorola Mobility LLC, Chicago, IL (US)

(72) Inventor: Xiaofeng Zhu, Nanjing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/236,836

(22) Filed: Apr. 21, 2021

(30) Foreign Application Priority Data

Mar. 31, 2021 (CN) .......................... 202110350311.0

(51) Int. Cl.
*H04N 7/15* (2006.01)
*H04N 7/14* (2006.01)

(52) U.S. Cl.
CPC ............... *H04N 7/15* (2013.01); *H04N 7/142* (2013.01); *H04N 2007/145* (2013.01)

(58) Field of Classification Search
CPC ............. H04N 7/15; H04N 7/147; H04N 7/14
USPC ............................................ 348/14.01–14.16
See application file for complete search history.

(56) References Cited

U.S. PATENT DOCUMENTS

| | | | |
|---|---|---|---|
| 8,004,555 B2 | 8/2011 | Oswald et al. | |
| 2010/0315481 A1* | 12/2010 | Wijngaarden | H04N 7/142 348/14.07 |
| 2012/0060089 A1* | 3/2012 | Heo | G06F 3/1431 715/702 |
| 2015/0324002 A1* | 11/2015 | Quiet | G06F 3/0304 463/31 |
| 2021/0203877 A1* | 7/2021 | Erna | H04M 1/0264 |
| 2021/0208831 A1* | 7/2021 | Zhang | G06F 1/1694 |

FOREIGN PATENT DOCUMENTS

JP    2007201727 A  *  8/2007

OTHER PUBLICATIONS

CN 112312042A Feb. 2, 2021 Display Control Method, Device, Electronic Device And Storage Medium.*

* cited by examiner

*Primary Examiner* — Melur Ramakrishnaiah

(57) ABSTRACT

A system and method are provided for managing a mobile device to selectively act as a two-party endpoint in a videoconference with a remote party. The disclosed technique, by way of example, entails receiving first user video and audio from a first camera and mic located on the front of the mobile device and receiving second user video and audio from a second camera and mic located on the back of the device. Remote user video and audio are received at the device, and the remote user video and audio, and second user video and audio are conveyed via a first display screen and first speaker located on the front of the device. Similarly, the remote user video and audio, and first user video and audio are conveyed via a second display screen and second speaker located on the back of the device.

20 Claims, 11 Drawing Sheets

DUAL DISPLAY DUAL FACING CAMERA VIDEO CALL SYSTEM

TECHNICAL FIELD

The present disclosure is related generally to mobile electronic communications devices and, more particularly, to systems and methods for providing a multi-participant video call endpoint via a mobile electronic communications device.

BACKGROUND

Prior to the advent and widespread adoption of mobile electronic communications devices such as smart phones, many tasks that we now take for granted were handled via specialized, dedicated equipment. Such tasks include, among others, listening to audio information, viewing video information and engaging in conversation with one or more remote people. At the intersection of these tasks is the task of video teleconferencing, where remote entities can both see and hear each other as they converse.

Still, while mobile electronic communications devices have been widely adopted for use in video teleconferencing, the type of conferencing allowed is generally person-to-person, without an easy way to teleconference between remote groups or between a group and a remote individual.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussions of technology in this Background section is reflective of the inventors' own observations, considerations, actions and/or thoughts, and are in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, video teleconferencing between remote groups or between a group and a remote individual has long been the province of specialized equipment, despite the widespread adoption of cellular devices for more informal conferencing. This is due in large part to the inability of consumer level mobile electronic devices to facilitate multiple distinct local participant viewpoints during a video conferencing. At best, a typical consumer level mobile electronic device allows a few local participants to squeeze into the same image view during a video call, with all of the attendant distortion and discomfort that technique entails.

However, in an embodiment of the disclosed principles, a mobile electronic communications device employs front facing and back facing cameras to facilitate effectively simultaneous showing of both participants to a remote party or group during a video conference. In a further embodiment, a back screen is provided on the mobile electronic communications device to allow the second participant to not only be seen, but also to see the other participants. The second user's display view may include, but need not include, a view of the other local participant.

In an embodiment, the mobile electronic communications device is a smart phone or tablet having front and back cameras, a front screen, and optionally a back screen. In an alternative embodiment, the mobile electronic communications device is a flexible device having two cameras that act as front and back cameras when the device is flexed open. In this embodiment, the screen may also flex to provide a view on both sides of the flex axis.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
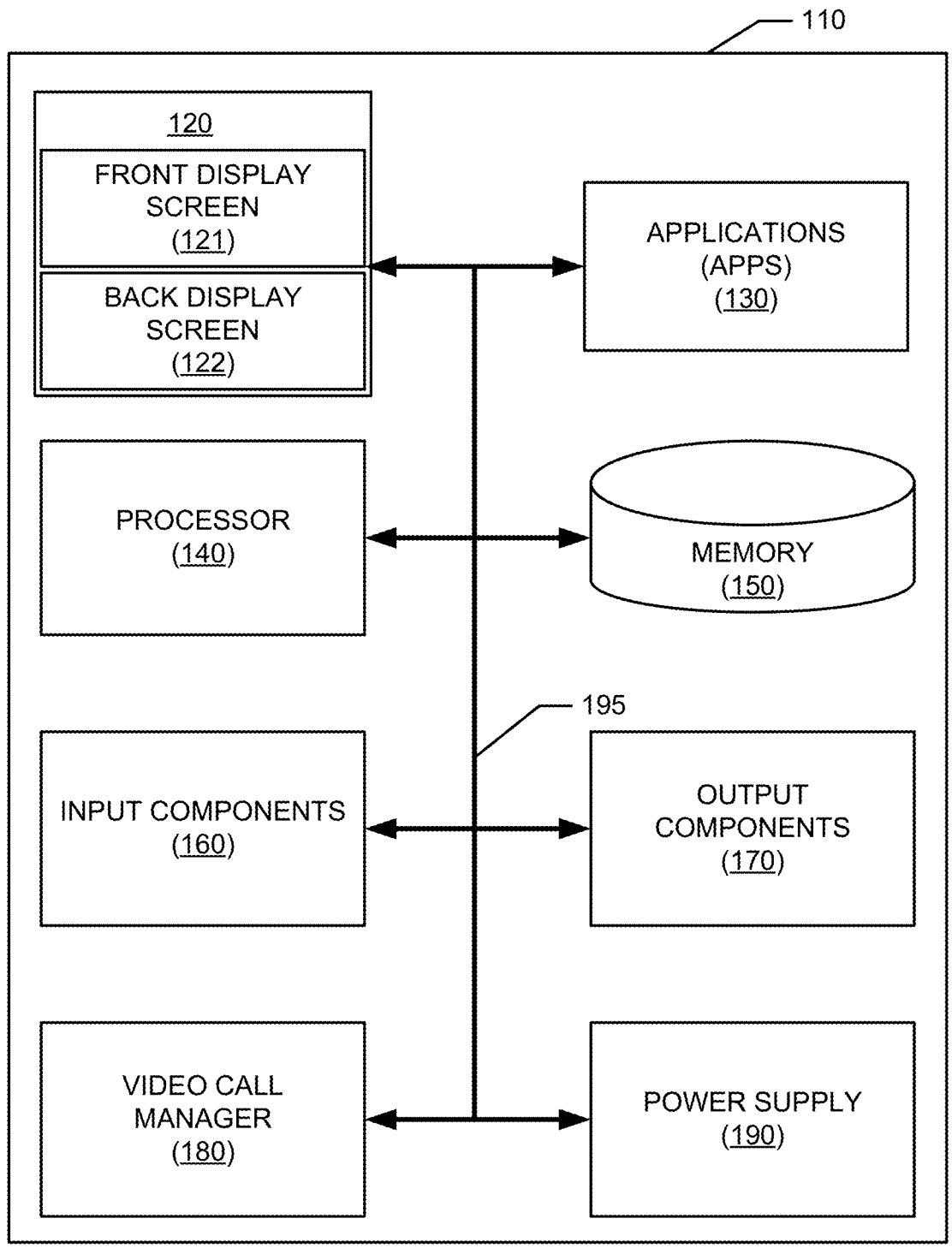
FIG. 1 is a general schematic representation of a mobile electronic device in which various embodiments of the disclosed principles may be implemented.

Thus, for example, while FIG. 1 is a simplified electrical schematic drawing illustrating components of an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the electronic device 110 include a display screen 120, which comprises at least a front display screen 121 and which optionally also comprises a back display screen 122. The device 110 further includes applications (e.g., applications) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, different generations of cellular service, e.g., 4G, 5G, etc.

The device 110 as illustrated also includes one or more output components 170 such as RF (radio frequency) or wired output facilities. The RF output facilities may similarly support any number of protocols, e.g., WiFi, Bluetooth, cellular including 5G, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a video call manager 180 executes functions associated with the behaviors described herein with respect to hosting or maintaining a dual camera video call endpoint on the device 110. In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

In an embodiment, the input components 160 and output components 170 include one or more speakers, e.g., one or more earpiece speakers and one or more loudspeakers, as well as one or more microphones. In an embodiment, both front and back speakers are provided. It will be appreciated that these components may be built into the device 110, or alternatively, some or all may be separate from the device 110.

Figure 2:
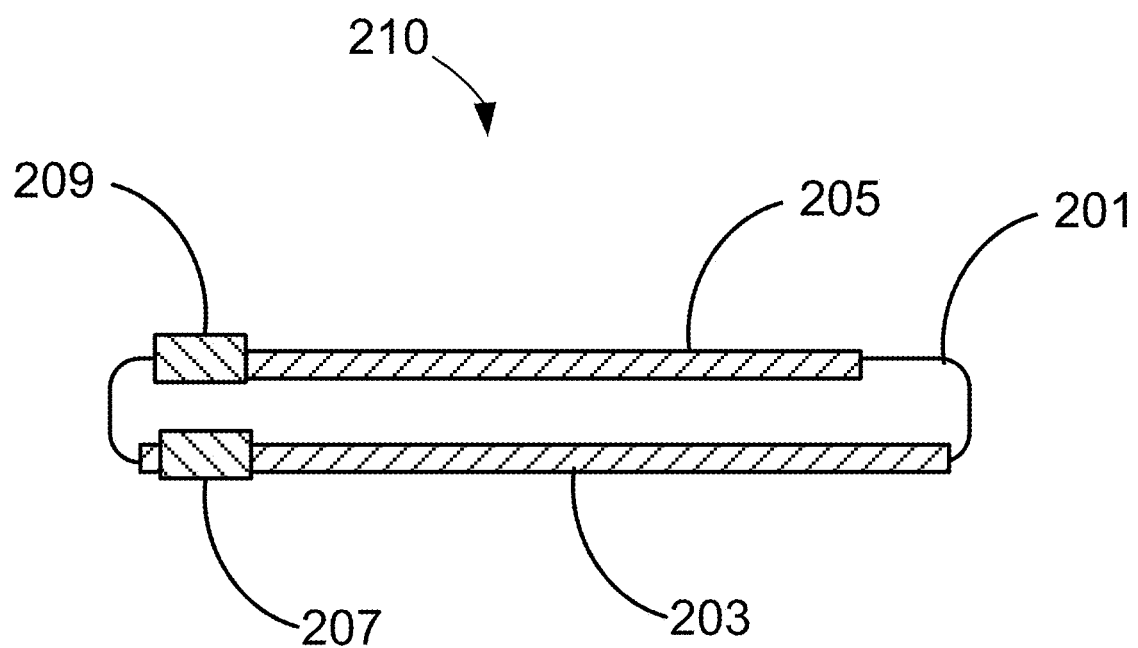
FIG. 2 is a simplified top cross-sectional view of a device such as the device shown schematically in FIG. 1 in accordance with an embodiment of the disclosed principles.
Figure 4:
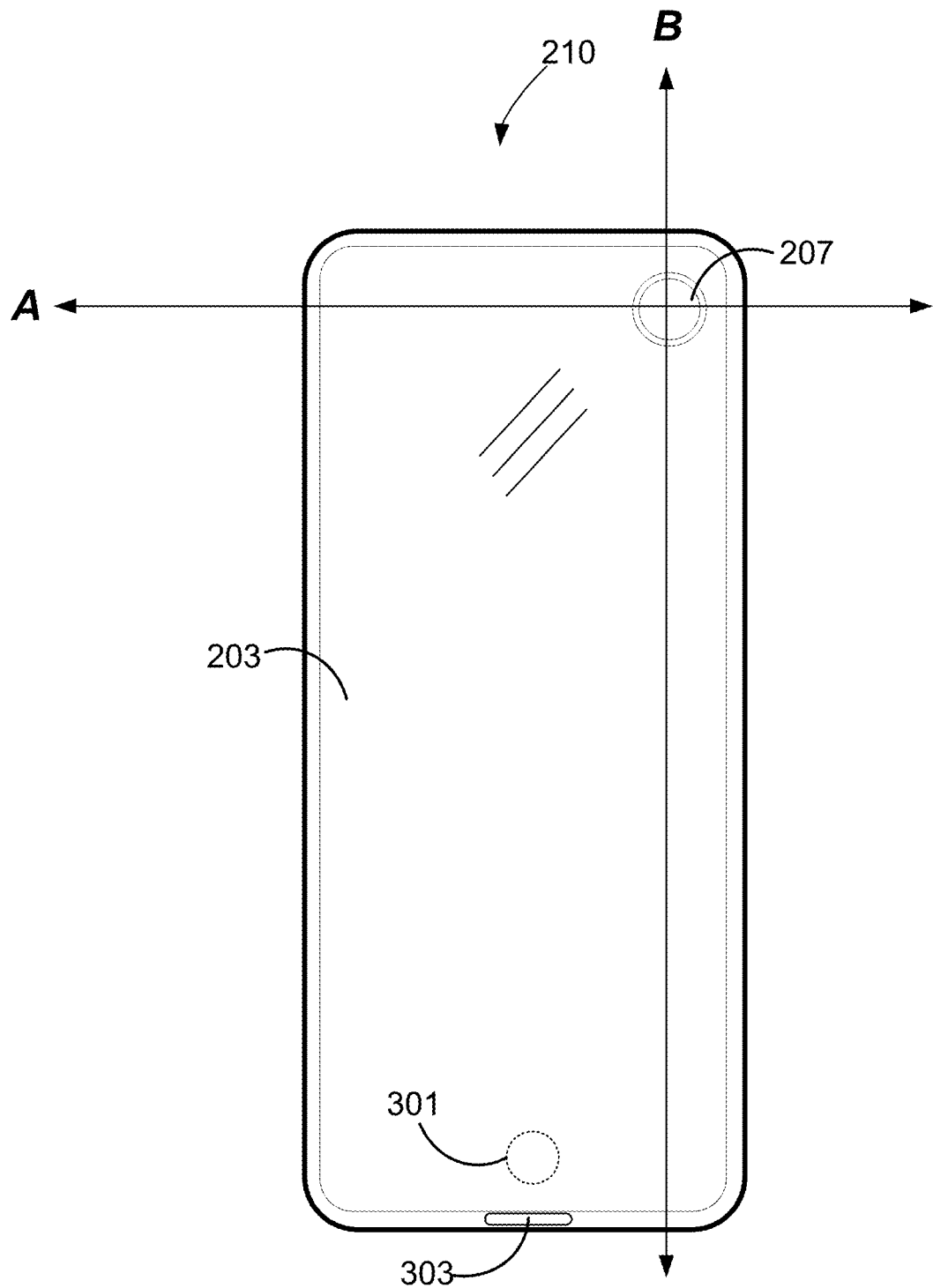
FIG. 4 is a simplified front view of a device such as the device shown schematically in FIG. 1 in accordance with an embodiment of the disclosed principles.

Turning to FIG. 2, this figure is a simplified top cross-sectional view of a cellular phone such as the device 110 of FIG. 1 taken at the level of its cameras (Axis A in FIG. 4). As can be seen, the device 210 includes a main body or housing 201. Mounted to or into the housing 201 are a front screen 203, a back screen 205, a front camera 207 and a back camera 209.

While the front screen 203 and back screen 205 are shown as being of similar, but not identical, sizes, it will be appreciated that the relative sizes of the screens are not relevant, and they may be of the same size, slightly different sizes, or greatly different sizes. A front mic and speaker (not visible in this view) and back mic and speaker (not visible in this view) are also included in the device 210.

In an alternative embodiment, the front screen 203 and front camera 207 are part of a first mobile electronic communications device, while the back screen 205 and back camera 209 reside on an add-on module or "mod" device. In this embodiment, the front mic and speaker (not visible in this view) reside on the first mobile electronic communications device and the back mic and speaker (not visible in this view) are located on the mod device.

Figure 3:
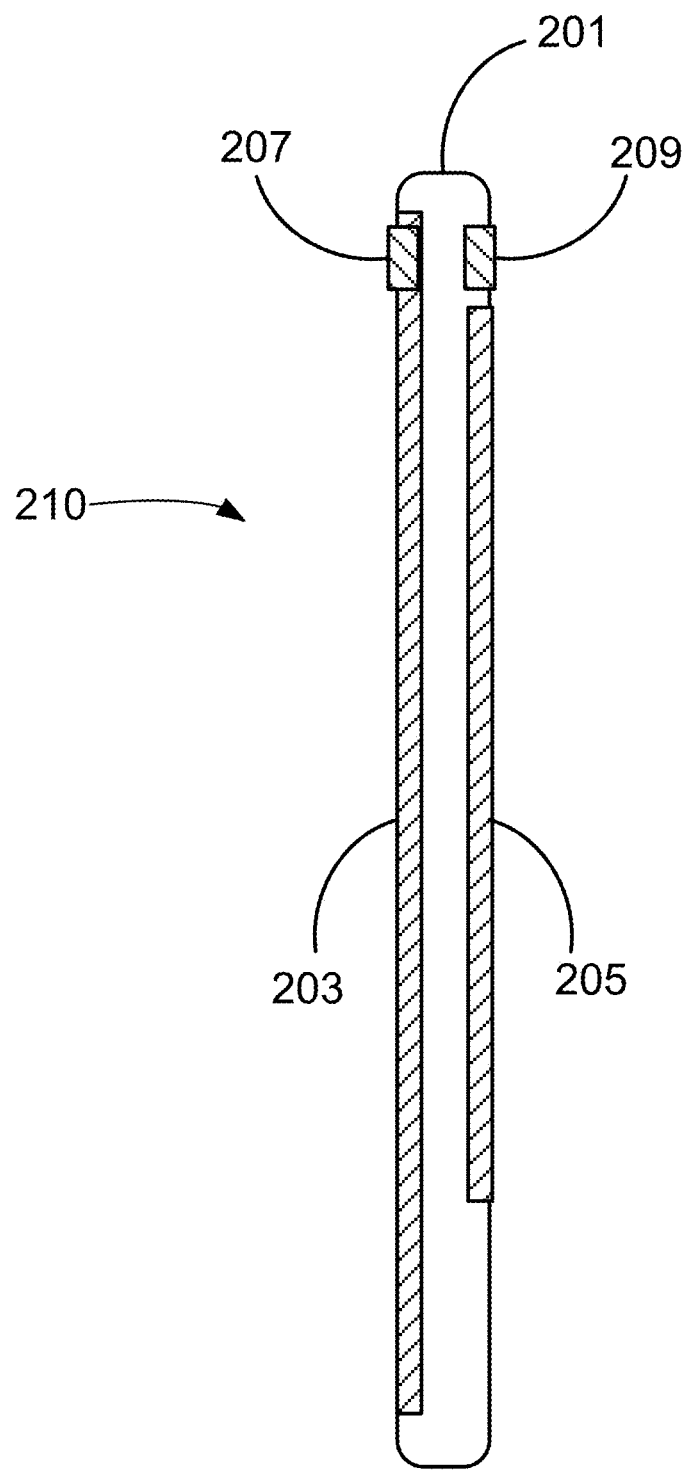
FIG. 3 is a simplified side view of a device such as the device shown schematically in FIG. 1 in accordance with an embodiment of the disclosed principles.

Turning to FIG. 3, this figure shows a simplified side cross-sectional view of the device 210 in accordance with an embodiment of the disclosed principles, taken along Axis B in FIG. 4. In this view, the front screen 203, back screen 205, front camera 207 and back camera 209 can be seen relative to the housing 201. Again, the front screen 203 and the back screen 205 may be of different sizes or of the same size.

The locations of the microphones and speakers will be better appreciated from FIG. 4, which is a simplified front view of the device 210 in accordance with an embodiment of the disclosed principles. In addition to showing Axis A and Axis B along which FIGS. 2 and 3 respectively are taken, FIG. 4 also shows the location of a front speaker 301 and a front microphone (mic) 303.

Figure 5:
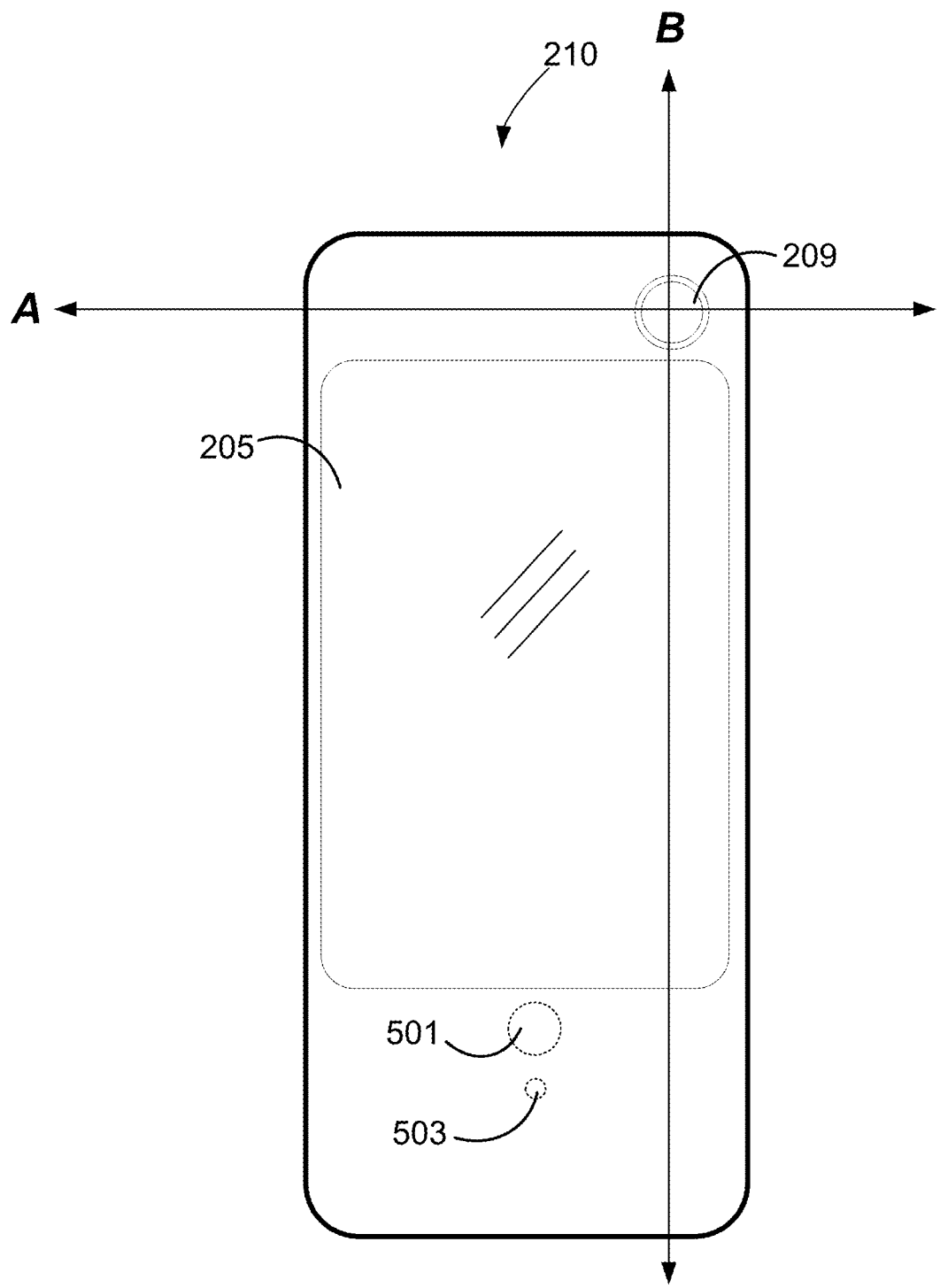
FIG. 5 is a simplified back view of a device such as the device shown schematically in FIG. 1 in accordance with an embodiment of the disclosed principles.

FIG. 5 is a simplified back view of the device 210 in accordance with an embodiment of the disclosed principles. In addition to showing Axis A and Axis B along which FIGS. 2 and 3 respectively are taken, FIG. 5 also shows the location of a back speaker 501 and a back mic 503.

Figure 6:
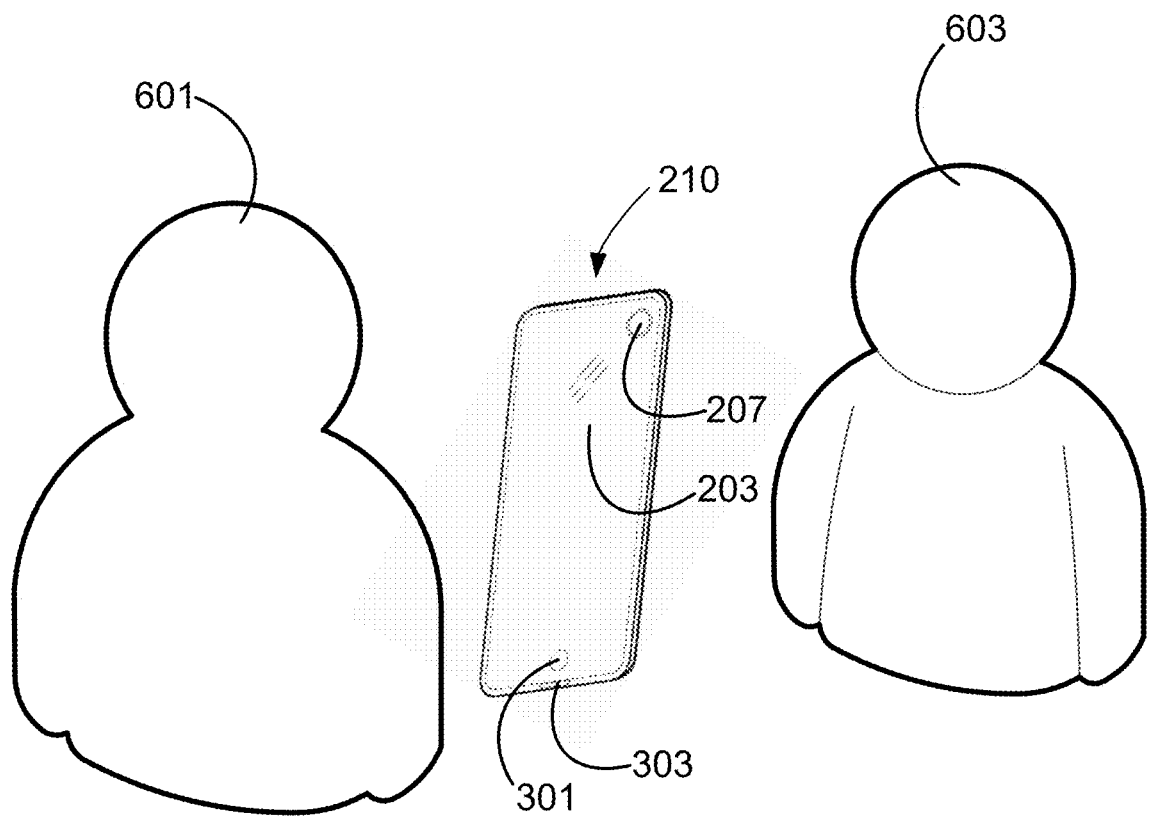
FIG. 6 is a simplified usage environment diagram showing a device used in a video conference in accordance with an embodiment of the disclosed principles.

FIG. 6 is a simplified usage environment diagram showing the device 210 used in a video conference in accordance with an embodiment of the disclosed principles, wherein a first user 601 is viewing the front side of the device 210 and a second user 603 is viewing the back of the device 210 (back not visible in FIG. 6). The device is linked during the videoconference with a remote device, not shown.

As can be seen, the first user 601 is able to use the front screen 203 and front camera 207 for visual communication and the front speaker 301 and front mic 303 for verbal communication. The second user 603 similarly engages in video and verbal communication via the back screen 205, back camera 209, back speaker 501 and back mic 503 (not visible in FIG. 6).

Figure 7:
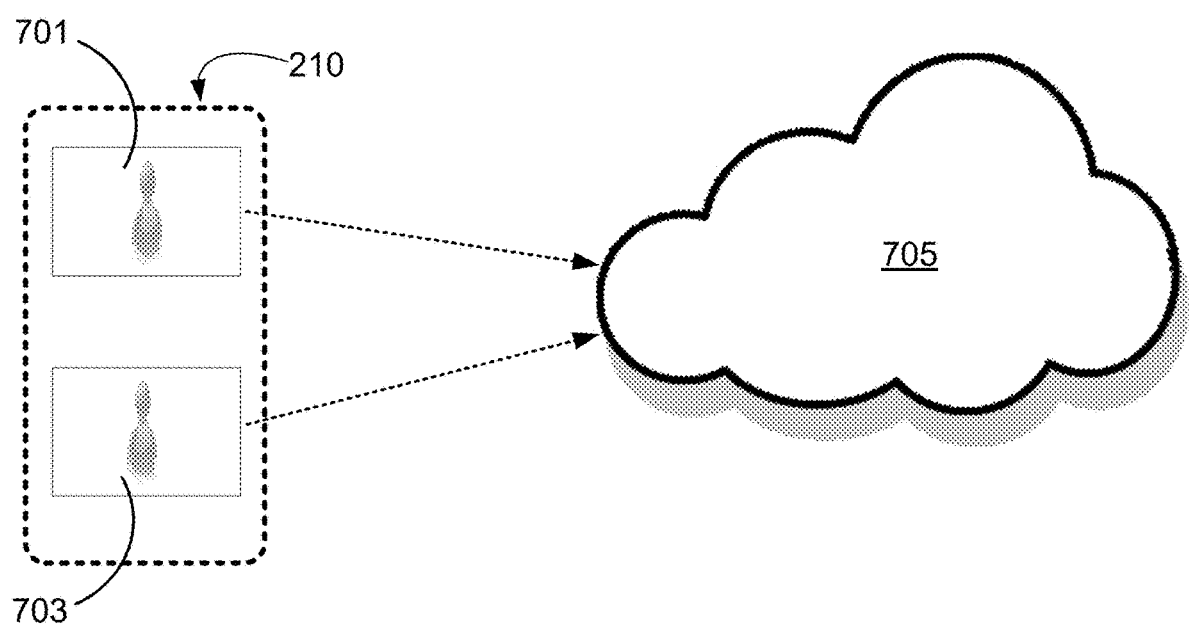
FIG. 7 is a schematic network view showing a device and network configuration in accordance with an embodiment of the disclosed principles.

FIG. 7 is a schematic network view showing a device such as device 210 and a network configuration in accordance with an embodiment of the disclosed principles. In the illustrated example, the device 210 is supporting two video conference streams 701 and 703 from the front camera 207 and rear camera 209 respectively (not shown in this figure). The videoconference streams 701, 703 are each transmitted to a videoconference backend on the internet 705 for further processing.

Figure 8:
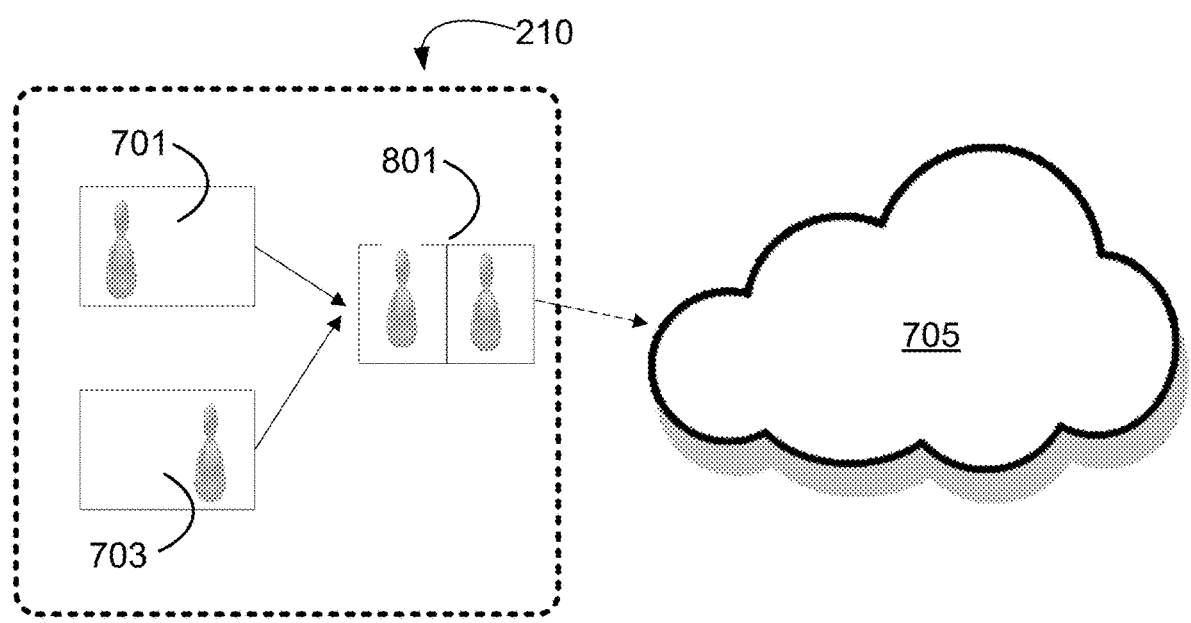
FIG. 8 is a schematic network view showing a device and network configuration in accordance with an alternative embodiment of the disclosed principles.

In an alternative embodiment shown in FIG. 8, the device 210 combines the videoconference streams 701 and 703 into a single stream 801 prior to videoconference backend on the internet 705 for further processing.

Figure 9:
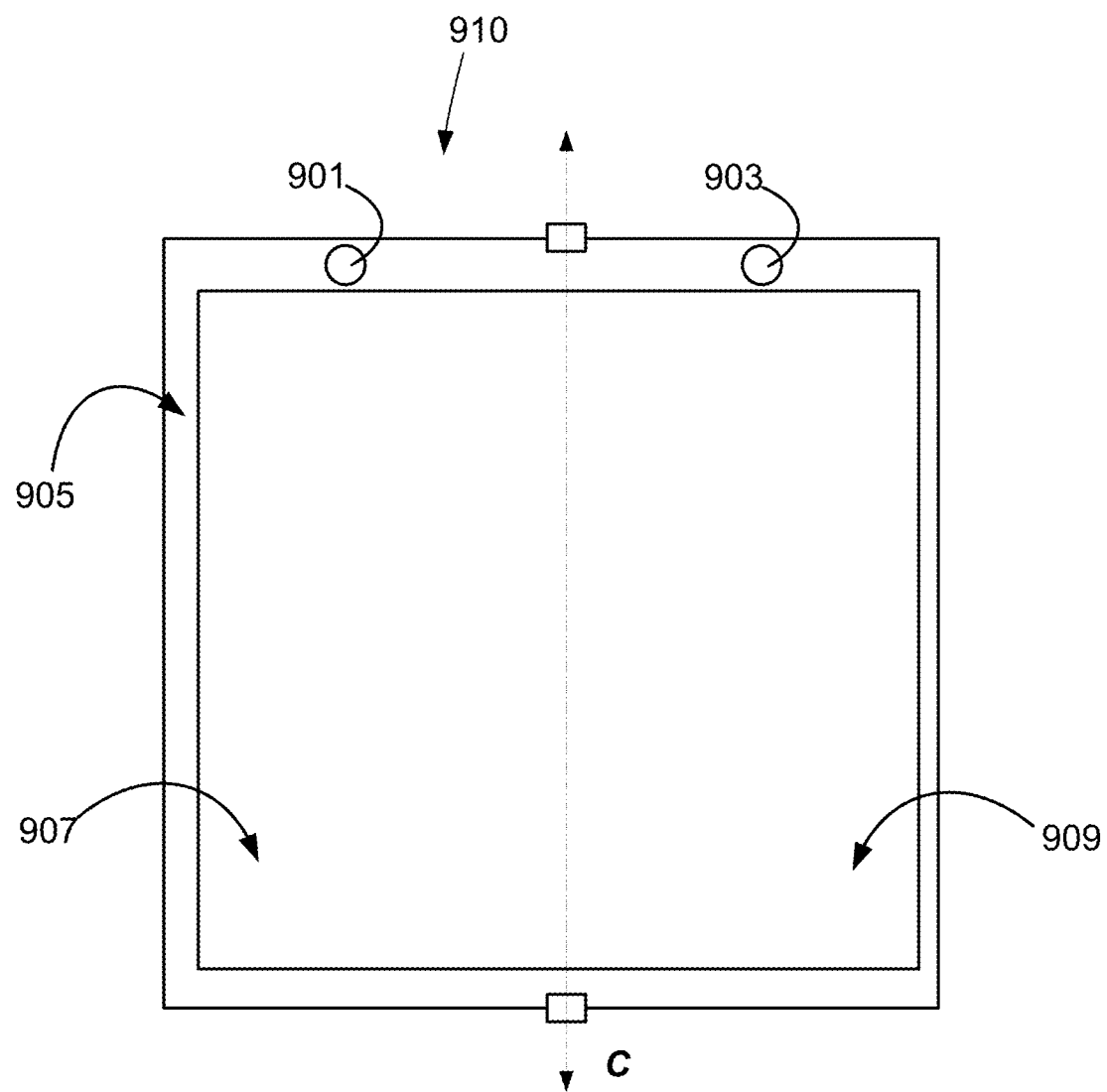
FIG. 9 is a simplified perspective view of an alternative device in accordance with an alternative embodiment of the disclosed principles.

FIG. 9 is a simplified plan view of an alternative device in accordance with an alternative embodiment of the disclosed principles. The disclosed device 910 is a mobile communications device such as that shown schematically in FIG. 1, but with a configuration that differs from the cellular phone planform of the device 210 of FIGS. 2-6. In particular, the illustrated device 910 is similar in size to a tablet or book, and has a first camera 901 and a second camera 903 on its front side. A large screen 905 is also located on the front of the device 910, and the device is flexible along the central axis C.

Figure 10:
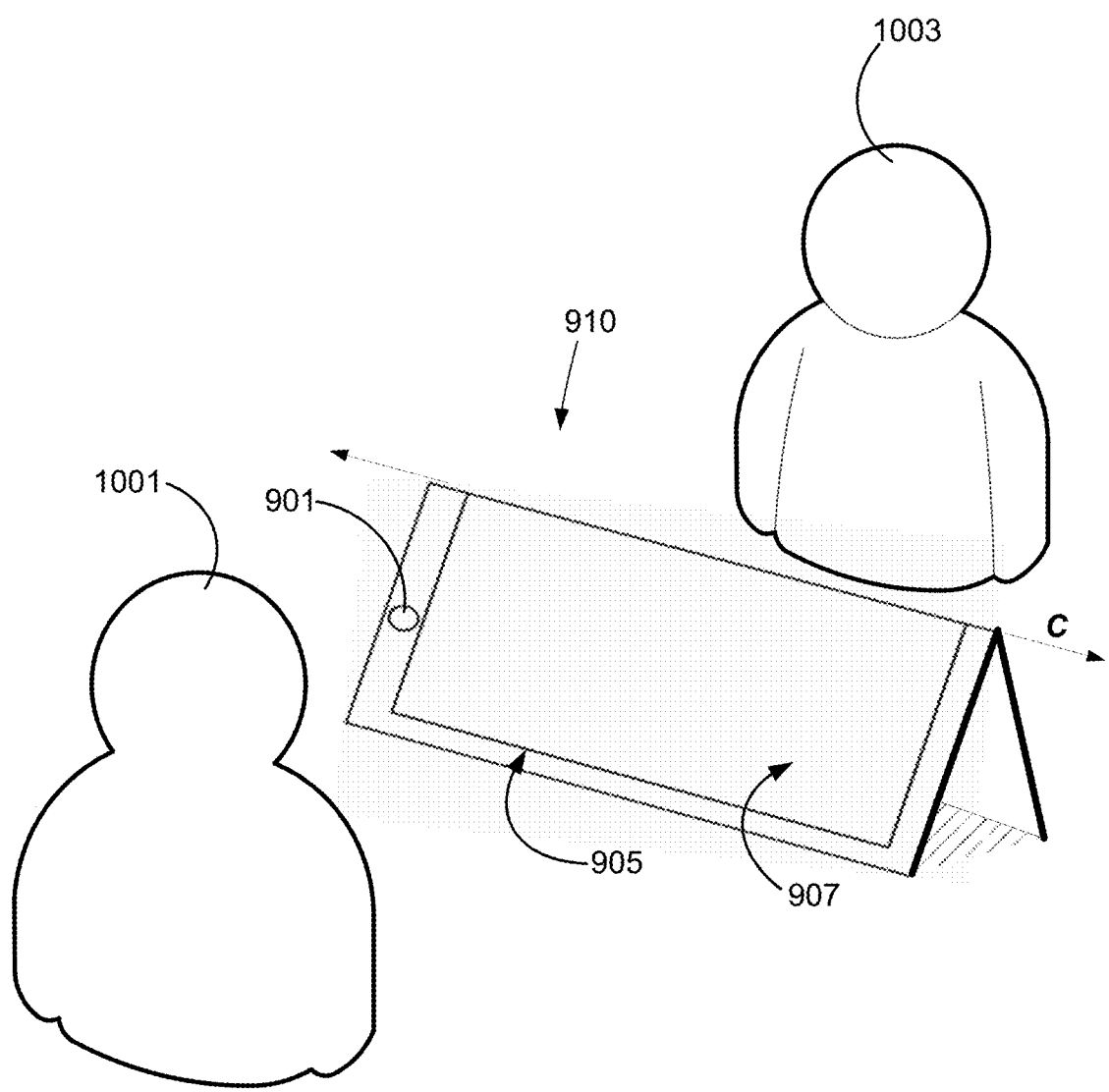
FIG. 10 is a simplified front view of the device of FIG. 9.

Upon being flexed at Axis C and set on a surface such as a table top, the device 910 can be used for a two party endpoint during a videoconference in the same manner as device 210. In particular, as shown in FIG. 10, the device 910 is placed between two users 1001 and 1003, with the first screen portion 907 facing the first user 1001 and the second screen portion (909 in FIG. 9) facing the second user 1003. In this configuration the first camera 901 faces the first user 1001, and the second camera (903 in FIG. 9) faces the second user 1003. First and second speakers and first and second mics may be used, as shown in FIGS. 4 and 5, or alternatively, either function may be served by a single centrally located speaker or mic.

Figure 11:
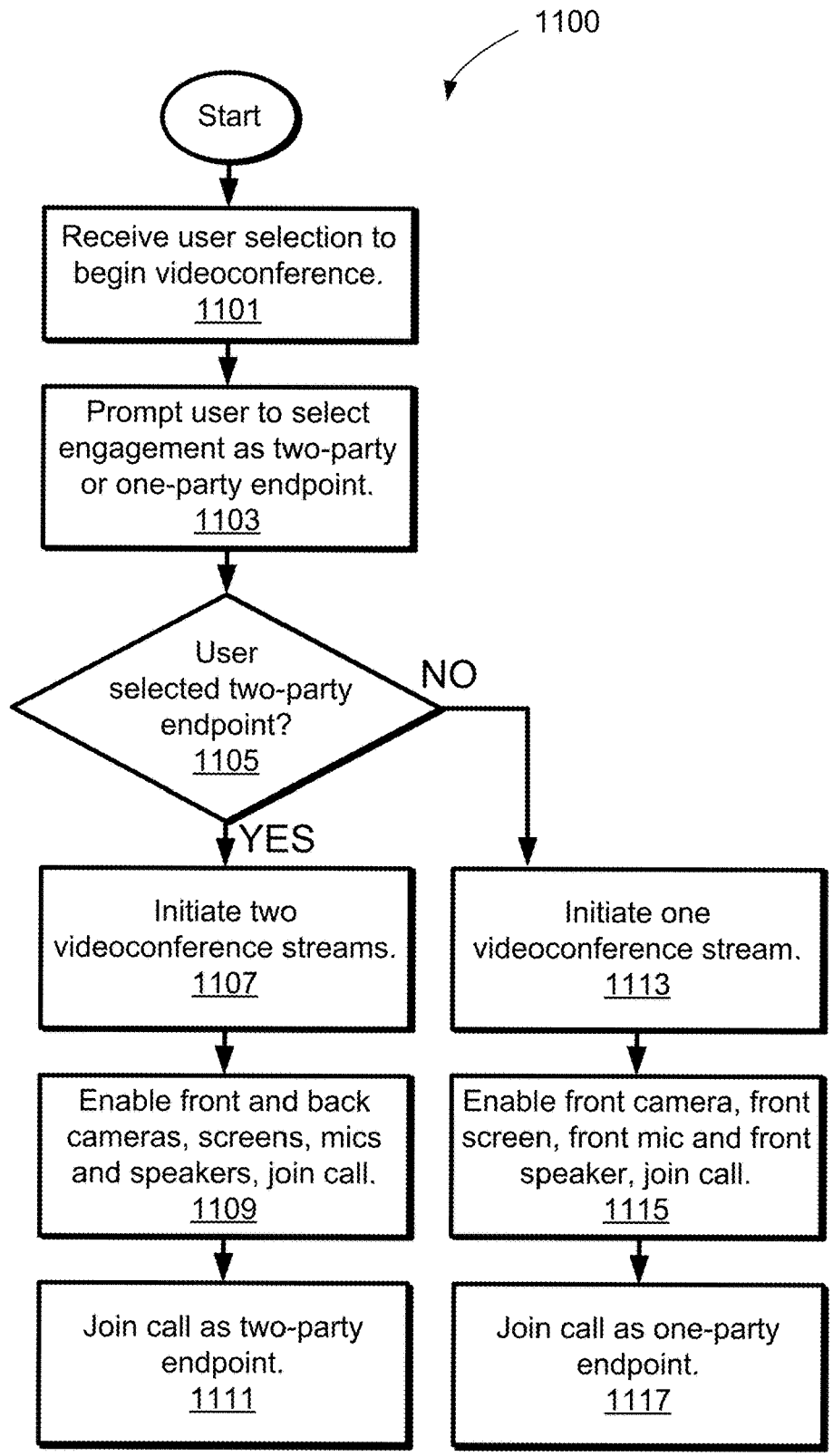
FIG. 11 is a flow chart showing a process of video teleconference management in accordance with an embodiment of the disclosed principles.

FIG. 11 is a flow chart showing a process of video teleconference management in accordance with an embodiment of the disclosed principles. At stage 1101 of the illustrated process 1100, a device such as device 210 or device 910 receives a user selection to begin a videoconference. This selection may be menu driven or initiated by a gesture. With respect to an incoming video call, for example, the user may answer the call.

The device then presents an option to the user at stage 1103 to engage the device as a two-party endpoint (the user and another person at the same location), or to engage the device as a single-party endpoint (e.g., just the user).

At stage 1105, if the user has selected to engage the device as a two-party endpoint, the process 1100 flows to stage 1107 wherein the device initiates two video streams. Subsequently at stage 1109, the device enables the front and back cameras, front and back screens, front and back speakers and front and back mics. At stage 1111, the device joins the call as a two-party endpoint.

If at stage 1105, the user instead chose to engage in a single-party videoconference, the process 1100 flows to stage 1113, wherein the device initiates one video stream. Subsequently at stage 1115, the device enables the front camera, front screen, front speaker(s) and front mic(s). At stage 1117, the device joins the call as a single-party endpoint. It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A mobile electronic communications device for selectively acting as a two-party endpoint in a videoconference with a remote user, the mobile electronic communications device comprising:
   a housing having a front side and a back side;
   a first camera located at the front side of the housing and a second camera located at the back side of the housing;
   a first display screen located at the front side of the housing and a second display screen located at the back side of the housing;
   at least one speaker;
   at least one microphone (mic);
   a bi-directional network connection; and
   a processor configured to:
   present a prompt to a user to select between two-party endpoint engagement and one-party endpoint engagement during the videoconference and, only in response to a user selection engaging the mobile electronics communication device to engage as the two-party endpoint:
   facilitate the two-party endpoint in the videoconference by receiving:
   first user video from the first camera;

first user audio from the at least one mic;
second user video from the second camera;
second user audio from the at least one mic; and
remote user video and remote user audio from the bi-directional network connection;
convey the remote user video, the remote user audio, the second user video, and the second user audio to a first user via the first display screen and the at least one speaker, respectively;
convey the remote user video, the remote user audio, the first user video, and the first user audio to a second user via the second display screen and the at least one speaker respectively; and
convey the first user video, the first user audio, the second user video, and the second user audio to a remote user via the bi-directional network connection;
wherein the housing comprises a first housing having a first housing front side and a first housing back side and a second housing having a second housing front side and a second housing back side, the first housing enclosing the mobile electronic communications device, the second housing enclosing an add-on device, wherein the first housing and the second housing join at their respective back sides to form a single housing, and wherein the back side of the housing is defined by the second housing front side.

2. The mobile electronic communications device according to claim 1, wherein the housing comprises a flex axis.

3. The mobile electronic communications device according to claim 1, wherein conveying the first user video, the first user audio, the second user video, and the second user audio to the remote user via the bi-directional network connection comprises generating a single video stream containing the first user video, the first user audio, the second user video, and the second user audio.

4. The mobile electronic communications device according to claim 1, wherein conveying the first user video, the first user audio, the second user video, and the second user audio to the remote user via the bi-directional network connection comprises generating a first video stream containing the first user video and a second video stream containing the second user video.

5. The mobile electronic communications device according to claim 1, wherein the second camera and the second display screen are located on the add-on device.

6. The mobile electronic communications device according to claim 1, wherein the first camera is associated with the mobile electronic communications device and the second camera is associated with the add-on device.

7. The mobile electronic communications device according to claim 1, wherein the first display screen is associated with the mobile electronic communications device and the second display screen is associated with the add-on device.

8. A method for managing a mobile electronic communications device to selectively act as an endpoint in a videoconference with a remote user, the method comprising:
prompting, in response to a user selection to begin the videoconference, for a user selection to either engage the mobile electronic communications device as a one-party endpoint in the videoconference or a two-party endpoint in the videoconference;
receiving, in response to the prompting, a user selection engaging the mobile electronic communications device as either the one-party endpoint or the two-party endpoint; and
when the user selection engages the mobile electronic communications device as the one-party endpoint:
receiving first user video from a first camera and first user audio from a first microphone (mic), the first camera and first mic being located on a front of the mobile electronic communications device;
receiving remote user video and remote user audio at the mobile electronic communications device from a remote device over a network connection;
conveying the remote user video, the remote user audio, the first user video, and the first user audio to a first user via a first display screen and a first speaker, respectively, the first display screen and first speaker being located on the front of the mobile electronic communications device; and
conveying the first user video and the first user audio to a remote user via the network connection; and
when the user selection engages the mobile electronic communications device as the two-party endpoint:
receiving the first user video from the first camera and the first user audio from the first mic;
receiving second user video from a second camera and second user audio from a second mic, the second camera and second mic being located on a back of the mobile electronic communications device;
receiving the remote user video and the remote user audio at the mobile electronic communications device from the remote device over the network connection;
conveying the remote user video, the remote user audio, the second user video, and the second user audio to the first user via the first display screen and the first speaker, respectively;
conveying the remote user video, the remote user audio, the first user video, and the first user audio to a second user via a second display screen and a second speaker respectively, the second display screen and second speaker being located on the back of the mobile electronic communications device; and
conveying the first user video, the first user audio, the second user video, and the second user audio to the remote user via the network connection;
wherein the mobile electronic communications device comprises a front side and back side, the back side being joined to another back side of an add-on device, such that the mobile electronic communications device and the add-on device form a single device, and a rear side of the single device is defined by another front side of the add-on device.

9. The method according to claim 8, further comprising enabling the first camera and the second camera, the first mic and the second mic, the first speaker and the second speaker, and the first display screen and the second display screen in response to the user selection engaging the mobile electronic communications device as the two-party endpoint.

10. The method according to claim 8, further comprising enabling only the first camera the first mic, the first speaker, and the first display screen, without enabling the second camera, the second mic, the second speaker, and the second display screen, in response to the user selection engaging the mobile electronic communications device as the one-party endpoint.

11. The method according to claim 8, further comprising:
enabling the first camera and the second camera, the first mic and the second mic, the first speaker and the second speaker, and the first display screen and the second display screen in response to the user selection engaging the mobile electronic communications device as the two-party endpoint; and causing the mobile electronic communications device to join the videoconference as the two-party endpoint thereafter.

12. The method according to claim 8, wherein the first display screen and the second display screen are different sizes.

13. The method according to claim 8, wherein the first camera is associated with the mobile electronic communications device and the second camera is associated with the add-on device.

14. The method according to claim 8, wherein the first display screen is associated with the mobile electronic communications device and the second display screen is associated with the add-on device.

15. A non-transitory computer-readable medium having thereon computer-executable instructions for causing a mobile electronic communications device to selectively act as a two-party endpoint in a videoconference with a remote user, the computer-executable instructions comprising instructions for:

receiving first user video from a first camera and first user audio from a first microphone (mic), the first camera and the first mic being located on a front side of the mobile electronic communications device;

receiving second user video from a second camera and second user audio from a second mic, the second camera and the second mic being located on the front side of the mobile electronic communications device;

receiving remote user video and remote user audio at the mobile electronic communications device from a remote device over a network connection;

conveying the remote user video, the remote user audio, the second user video, and the second user audio to a first user via a first display screen portion and a first speaker, respectively, the first display screen portion and the first speaker being located on the front side of the mobile electronic communications device;

conveying the remote user video, the remote user audio, the first user video, and the first user audio to a second user via a second display screen portion and a second speaker, respectively, the second display screen portion and second speaker being located on the front side of the mobile electronic communications device; and conveying the first user video, first user audio, second user video and second user audio to a remote user via the network connection;

wherein the front side and back side of the mobile electronic communications device are connected at a flex axis with a flexible display screen spanning and being continuous across the flex axis, thereby defining the first display screen portion positioned to one side of the flex axis and the second display screen portion positioned to another side of the flex axis; and wherein the receiving the second user video from the second camera for the videoconference and the second user audio from second mic for the videoconference only occurs when the mobile electronic communications device is flexed open more than 180 degrees.

16. The non-transitory computer-readable medium according to claim 15, wherein the flex axis and flexible display are bent to a convex angle such that the first display screen portion of the flexible display screen is visible to the first user and the second display screen portion of the flexible display screen is visible to the second user.

17. The non-transitory computer-readable medium according to claim 16, wherein the first mic and the second mic are defined by a centrally located mic.

18. The non-transitory computer-readable medium according to claim 15, the computer-executable instructions further comprising instructions for prompting for a user selection to either engage the mobile electronic communications device as a one-party endpoint in the videoconference or the two-party endpoint in the videoconference.

19. The non-transitory computer-readable medium according to claim 15, wherein the mobile electronic communications device comprises a smart phone.

20. The non-transitory computer-readable medium according to claim 15, the second camera and the second mic are only enabled in response to receipt of a user selection engaging the mobile electronics communication device as the two-party endpoint in the videoconference.

* * * * *